US012594491B2

(12) United States Patent
Zeng et al.

(10) Patent No.: US 12,594,491 B2
(45) Date of Patent: Apr. 7, 2026

(54) THUMBSTICK ASSEMBLY WITH ADJUSTABLE DAMPING AND GAMEPAD

(71) Applicant: GUANGDONG K-SILVER INDUSTRIAL CO., LTD., Shenzhen (CN)

(72) Inventors: Xiao Zeng, Shenzhen (CN); Jianbo Zhao, Shenzhen (CN)

(73) Assignee: GUANGDONG K-SILVER INDUSTRIAL CO., LTD., Shenzhen (CN)

( * ) Notice: Subject to any disclaimer, the term of this patent is extended or adjusted under 35 U.S.C. 154(b) by 299 days.

(21) Appl. No.: 18/426,653

(22) Filed: Jan. 30, 2024

(65) Prior Publication Data

US 2025/0229173 A1      Jul. 17, 2025

(30) Foreign Application Priority Data

Jan. 12, 2024    (CN) ......................... 202420085377.0

(51) Int. Cl.
*A63F 13/24* (2014.01)

(52) U.S. Cl.
CPC .................................... *A63F 13/24* (2014.09)

(58) Field of Classification Search
CPC ...................................................... A63F 13/24
See application file for complete search history.

(56) References Cited

U.S. PATENT DOCUMENTS

| | | | |
|---|---|---|---|
| 11,547,934 B2 * | 1/2023 | Falc | A63F 13/24 |
| 11,565,174 B2 * | 1/2023 | Squire | A63F 13/98 |
| 12,370,438 B2 * | 7/2025 | Hu | A63F 13/24 |
| 2009/0295724 A1 | 12/2009 | Cheng et al. | |
| 2017/0001106 A1 * | 1/2017 | Gassoway | G05G 9/047 |
| 2018/0333641 A1 * | 11/2018 | Strahle | A63F 13/24 |
| 2023/0218985 A1 * | 7/2023 | Summa | A63F 13/837 463/38 |

(Continued)

FOREIGN PATENT DOCUMENTS

| | | |
|---|---|---|
| CN | 113730901 A | 12/2021 |
| JP | 2001022463 A | 1/2001 |

(Continued)

OTHER PUBLICATIONS

Decision to Grant a Patent issued in counterpart Japanese Patent Application No. JP 2024-040052, dated Apr. 15, 2025.

*Primary Examiner* — Reginald A Renwick
(74) *Attorney, Agent, or Firm* — Westbridge IP LLC

(57) ABSTRACT

Disclosed is a thumbstick assembly, which includes a base part, a thumbstick part rotatably installed at the base part, an adjustment plate translationally connected to the base part, an adjustment knob, an adjustment base including a slide portion and a rotation portion, and a first spring. The adjustment knob is of a shell structure, located at an outer side of the thumbstick part, rotatably connected to the adjustment plate and configured to drive the adjustment plate translate close or away from the thumbstick part when being rotated. The slide portion and the stick of the thumbstick part are in telescopic nested sliding fit, and an upper end face of the adjustment plate abuts against the rotation portion. The first spring is sleeved on the slide portion. Two ends of the first spring respectively abuts against the rotation portion and the stick.

10 Claims, 8 Drawing Sheets

(56)                    References Cited

U.S. PATENT DOCUMENTS

2023/0218986  A1*    7/2023   Morrison  .............. A63F 13/285
                                                                      463/38

FOREIGN PATENT DOCUMENTS

JP             3236497  U        2/2022
JP             3241930  U        5/2023
JP             3244621  U       11/2023

* cited by examiner

THUMBSTICK ASSEMBLY WITH ADJUSTABLE DAMPING AND GAMEPAD

CROSS-REFERENCE TO RELATED APPLICATIONS

This application claims priority to Chinese Patent Application No. 202420085377.0, filed on Jan. 12, 2024, the entire contents of which are incorporated herein by reference.

TECHNICAL FIELD

The present application relates to the technical field of thumbsticks, and in particular to a thumbstick assembly with adjustable damping and a gamepad.

BACKGROUND

The most common gamepad on the market is usually configured with thumbsticks, buttons and triggers. The thumbstick can be tilted and rotated and is configured with a spring so as to automatically reset to the center. By tilting and rotating the thumbstick, the gamer inputs directional information to a device, such as a game console or a personal computer, to perform game operations. The elastic force which enables the thumbstick to reset to the center is called damping. Different gamers have different preferences for the size of the damping.

SUMMARY

The present application provides a thumbstick assembly with adjustable damping and a gamepad, aiming to allow the gamers to adjust the damping of the thumbstick according to their preference for the damping, so that a better gaming experience can be achieved. Meanwhile, the disabled gamers can also adjust the damping so as to play video games like normal people.

For this objective, the thumbstick assembly with adjustable damping provided by the present application includes a base part, a thumbstick part, an adjustment plate, an adjustment knob, an adjustment base and a first spring; the thumbstick part is rotatably installed at the base part and including a stick movable relative to the base part; the stick is formed with a first chamber; the adjustment plate is translationally connected to the base part; the adjustment knob is of a shell structure, located at an outer side of the thumbstick part, rotatably connected to the adjustment plate and configured to drive the adjustment plate translate close or away from the stick when being rotated; the adjustment base includes a slide portion and a rotation portion connected to the slide portion; the slide portion and the stick are in telescopic nested sliding fit, and an upper end face of the adjustment plate is abutted against the rotation portion; the first spring is sleeved on the slide portion; at least part of the first spring is accommodated in the first chamber; one end of the first spring is abutted against the rotation portion, and the other end of the first spring is abutted against the stick.

In some embodiments, the adjustment knob is rotatably connected to the adjustment plate by thread.

Further, in some embodiments, an inner wall of the adjustment knob is formed with internal thread, and a periphery of the adjustment plate is formed with external thread.

Further, in some embodiments, the turns of the internal thread of the adjustment knob is greater than the turns of the external thread of the adjustment plate.

In some embodiments, the thumbstick assembly further includes a second spring; one end of the second spring abuts against a lower end face of the adjustment plate, and the other end of second spring abuts against the base part.

Further, in some embodiments, the second spring is configured as a conical spiral spring.

In some embodiments, the adjustment plate is formed with multiple limiting holes, the base part is formed with multiple limiting columns corresponding to the multiple limiting holes, and the limiting columns pass through the limiting holes to restrict a rotation of the adjustment plate relative to the base part.

In some embodiments, the stick is further formed with a second chamber, the slide portion is a slide bar, and the slide bar is inserted into the second chamber and is in slidable fit with an inner wall of the second chamber.

Further, in some embodiments, a periphery of the slide bar is formed with multiple slide ridges, and the multiple slide ridges are in slidable fit with the inner wall of the second chamber.

In some embodiments, an upper end of the adjustment knob is formed with an adjustment ring, and multiple projections are formed on the adjustment ring.

In some embodiments, indicational arrows and/or indicational texts are provided on the upper end of the adjustment knob for indicating rotation directions of the adjustment knob.

The present application further provides a gamepad, which includes a gamepad housing and the above-mentioned thumbstick assembly with adjustable damping. The adjustment knob of the thumbstick assembly with adjustable damping is rotatably installed at the gamepad, the base part of the thumbstick assembly with adjustable damping is fixedly installed at the gamepad, and at least part of structure of the upper end of the adjustment knob passes through the installation opening and protrudes from an outer surface of the gamepad housing.

In some embodiments, the gamepad further includes an installation base provided inside the gamepad housing. The base part is fixedly installed on the installation base. The adjustment knob is of a column-shaped shell structure, and an outer diameter of the upper end of the adjustment knob gradually decreases in an extension direction of the upper end of the adjustment knob. A lower end of the adjustment knob abuts the installation base, and the upper end of the adjustment knob abuts an edge of the installation opening.

In the technical solution of the present application, the base part is used to be fixedly installed at an input device such as a gamepad; the thumbstick part is rotatably installed at the base part; the thumbstick part includes a stick movable relative to the base part, so that the stick can be pulled by gamers to be tilted and rotated; the adjustment base includes a slide portion and a rotation portion connected to the slide portion; the slide portion and the stick are in telescopic nested sliding fit; the first spring is sleeved on the slide portion and at least part of the first spring is accommodated in the first chamber of the stick; one end of the first spring is abutted against the rotation portion, and the other end of the first spring is abutted against the stick; the adjustment plate is translationally connected to the base part; the adjustment knob is located at an outer side of the thumbstick part and rotatably connected to the adjustment plate; an upper end face of the adjustment plate is abutted against the rotation portion; the adjustment knob is configured to drive the adjustment plate translate close or away from the stick when being rotated, so that the adjustment base is driven to move close or away from the stick, and the compression of the first spring can be adjusted, thereby achieving the effect of adjusting the damping of the thumbstick.

BRIEF DESCRIPTION OF THE DRAWINGS

In order to more clearly illustrate the technical solutions in the embodiments of the present application or in the related art, drawings that are needed to illustrate the embodiments and the related art are simply introduced below. Obviously, drawings introduced below are just some of the embodiments in the present application. For those of ordinary skill in the art, other figures may be further obtained without creative efforts according to the structures shown in drawings below.

Figure 1:
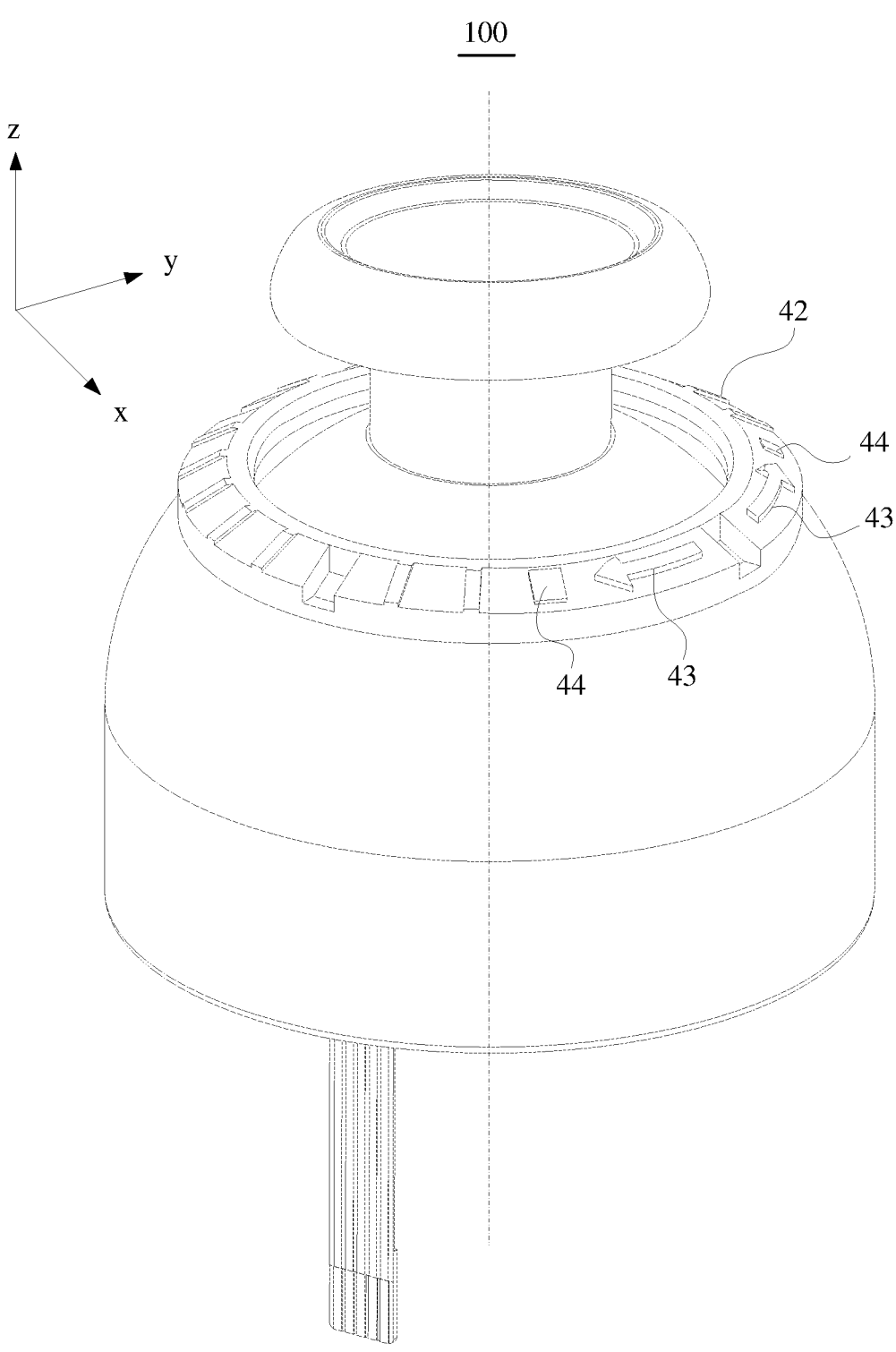
FIG. 1 is a perspective schematic structural view of a thumbstick assembly with adjustable damping according to an embodiment of the present application.

The realization of the purpose, the functional feature, and the advantage of present application will be further illustrated referring to the drawings.

DETAILED DESCRIPTION OF THE EMBODIMENTS

The technical solutions of the embodiments of the present application will be described clearly and completely below with reference to the accompanying drawings. It is obvious that the embodiments to be described are only some rather than all the embodiments of the present application. All other embodiments obtained by those of ordinary skill in the art in the art based on the embodiments of the present application without creative efforts should fall within the scope of the present application.

It should be noted that all the directional indications (such as up, down, left, right, front, rear, etc.) in the embodiments of the present application are only used to explain the relative positional relationship, movement, or the like of the components in a certain posture (as shown in the drawings). If the specific posture changes, the directional indication will change accordingly.

Besides, the descriptions associated with, e.g., "first" and "second," in the present application are merely for descriptive purposes, and cannot be understood as indicating or suggesting relative importance or impliedly indicating the number of the indicated technical feature. Therefore, the feature associated with "first" or "second" can expressly or impliedly include at least one such feature. The meaning of "and/or" appearing in the disclosure includes three parallel scenarios. For example, "A and/or B" includes only A, or only B, or both A and B. In addition, the technical solutions of the various embodiments can be combined with each other, but the combinations must be based on the realization of those of ordinary skill in the art. When the combination of technical solutions is contradictory or cannot be achieved, it should be considered that such a combination of technical solutions does not exist, nor does it fall within the scope of the present application.

An embodiment of the present application proposes a thumbstick assembly with adjustable damping.

Figure 2:
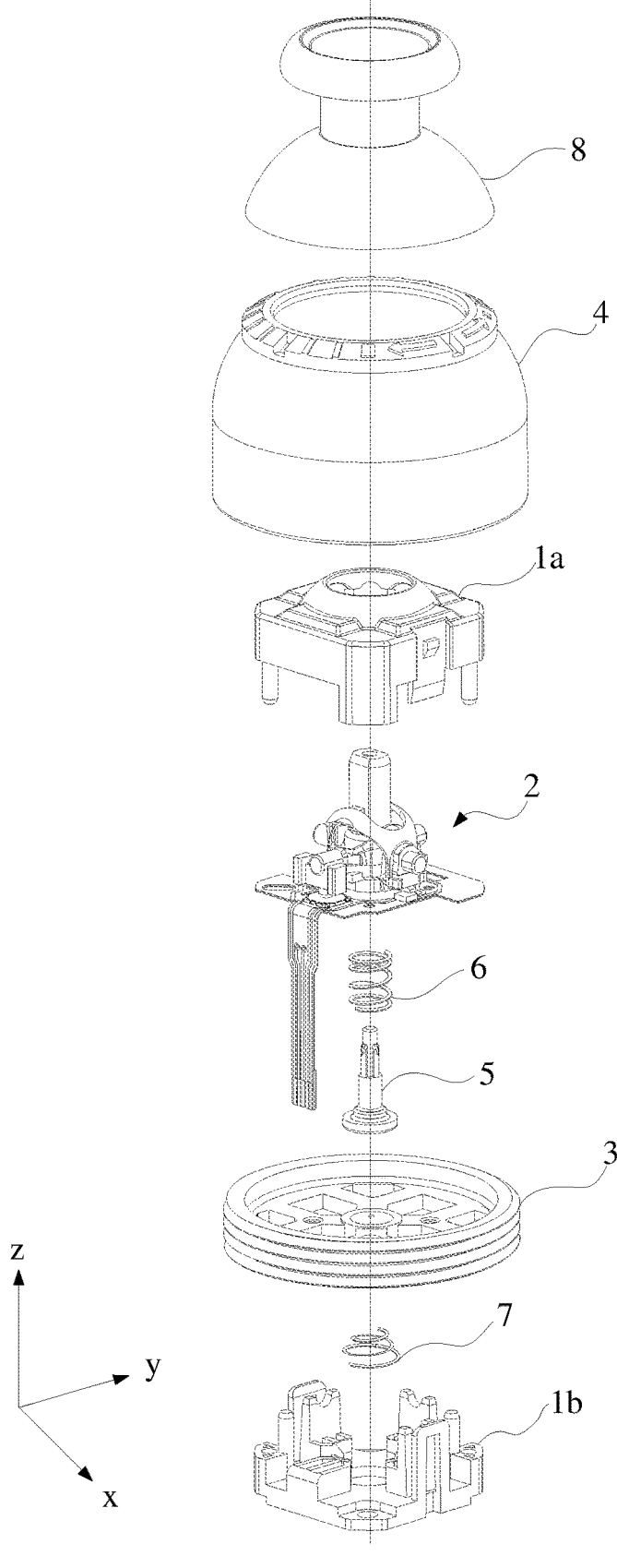
FIG. 2 is a schematic exploded view of FIG. 1.

Referring to FIGS. 1 and 2, the thumbstick assembly 100 proposed by this embodiment includes a base part, a thumbstick part 2, an adjustment knob 4, an adjustment plate 3, an adjustment base 5 and a first spring 6. The base part includes an upper shell 1a and a lower shell 1b. The thumbstick part 2 is rotatably installed at the base part and includes a stick 21 that is movable relative to the base part. The stick 21 is formed with a first chamber 211. The adjustment plate 3 is translationally connected to the base part. The adjustment knob 4 is of a shell structure and located at an outer side the thumbstick part 2. The adjustment knob 4 is rotatably connected to the adjustment plate 3 and configured to drive the adjustment plate 3 translate close or away from the stick 21 when being rotated. The adjustment base 5 includes a slide portion 51 and a rotation portion 52 connected to the slide portion 51. The slide portion 51 and the stick 21 are in telescopic nested sliding fit. An upper end face of the adjustment plate 3 is abutted against the rotation portion 52. The first spring 6 is sleeved on the slide portion 51 and at least part of the first spring 51 is accommodated in the first chamber 211. One end of the first spring 6 is abutted against the rotation portion 52, and the other end of the first spring 6 is abutted against the stick 21.

It can be understood that, in this embodiment, although the base part consists of the upper shell 1a and the lower shell 1b, the present application is not limited by this. The base part can be injection molded as a whole. The base part can be made of plastic or metal, and is configured to be fixed on input devices such as gamepads for fixing and supporting other components of the thumbstick assembly.

Figure 3:
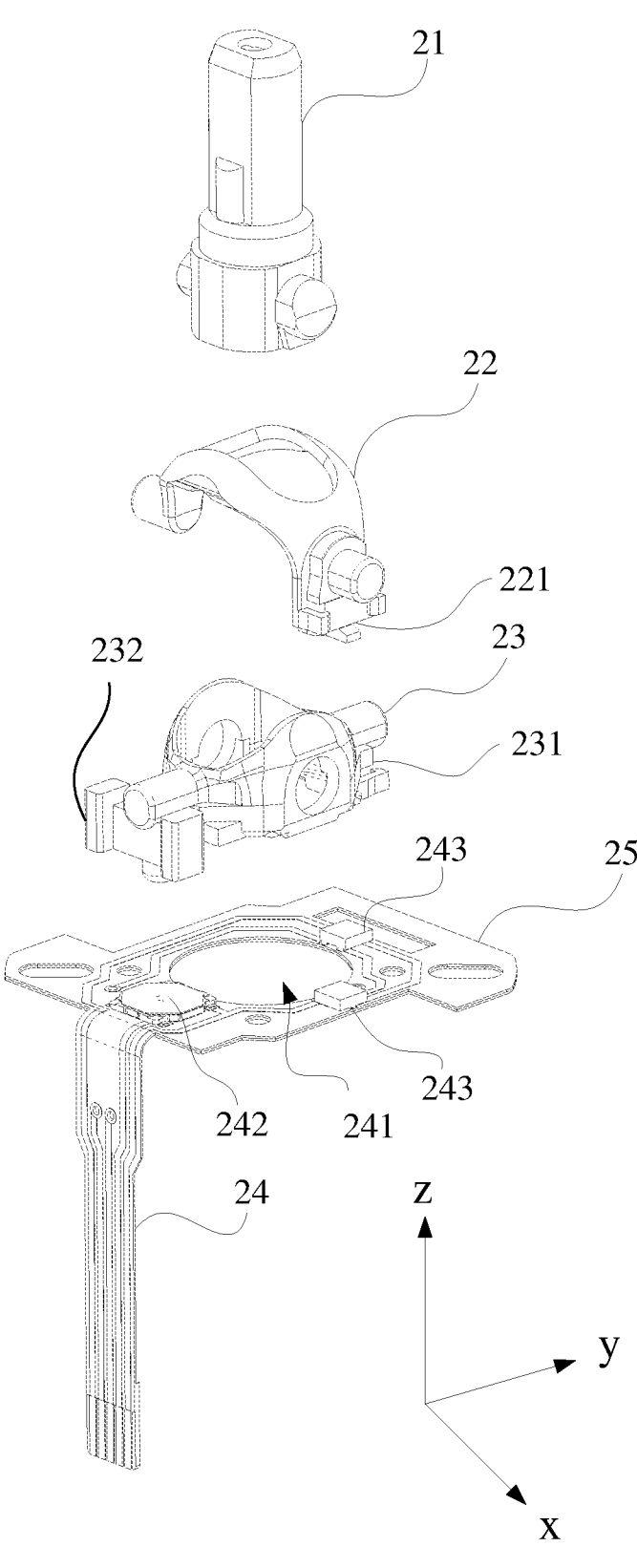
FIG. 3 is a schematic exploded view of the thumbstick part in FIG. 2.

Referring to FIG. 3, in this embodiment, the thumbstick part 2 includes a stick 21, an upper rocker arm 22, a lower rocker arm 23, a first magnet 221 installed on the upper rocker arm 22, a second magnet 231 installed on the lower rocker arm 23, a pressing base 232 connected to the lower rocker arm 23, a substrate 25, a flexible printed circuit board 24 mounted on the substrate 25, a dome switch 242 and Hall integrated circuits 243 mounted on the flexible printed circuit board 24. The upper rocker arm 22 and the lower rocker arm 23 are rotatably installed at the base part. The stick 21 is limited in the rotation structure formed by the upper rocker arm 22 and the lower rocker arm 23 so it can be pulled by gamers to tilt and rotate. The flexible printed circuit board 24 and the substrate 25 are formed with a through hole 241 for avoiding the adjustment base 5. The pressing base 232 can be driven by the lower rocker arm 23 to press the dome switch 242 to achieve outputting a tapping operation of the stick 21. The first magnet 221 and the second magnet 231 are respectively coupled to the Hall integrated circuits 243 on the flexible printed circuit board 24, so that the rotation information of the upper rocker arm 22 and the lower rocker arm 23 can be converted into electrical signals to be outputted via the flexible printed circuit board 24. It should be noted that detailed descriptions of how the thumbstick part 2 install and rotate and how to convert magnetic field variation information into electrical signals have been fully disclosed in related patent documents, and which are also well-known to those skilled in the art, so there is no need to repeat them here.

Figure 5:
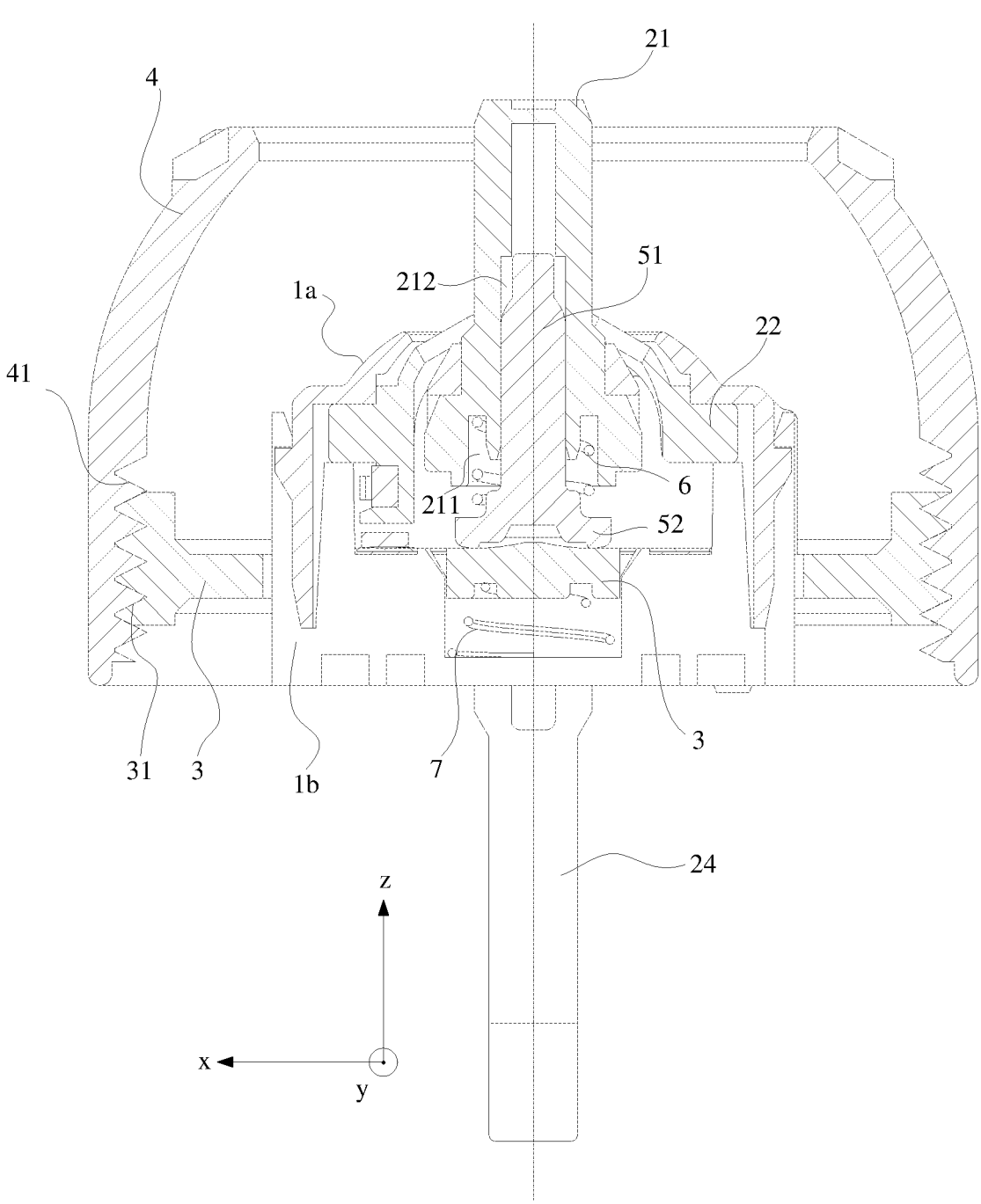
FIG. 5 is a cross-sectional view of the thumbstick assembly in FIG. 1 removing the thumbstick cap.
Figure 6:
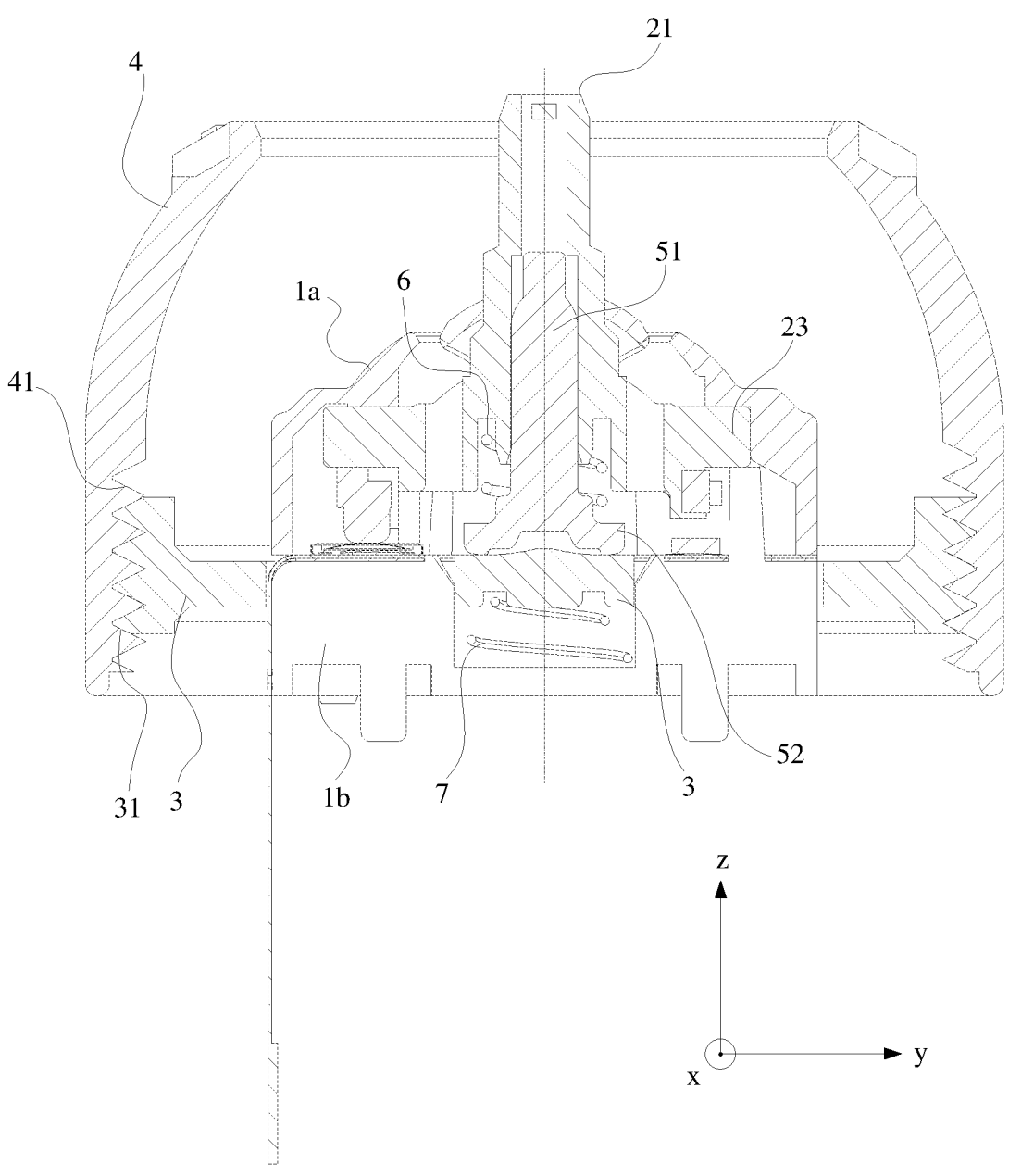
FIG. 6 is another cross-sectional view of the thumbstick assembly in FIG. 1 removing the thumbstick cap.

Specifically, referring to FIGS. 5 and 6, in this embodiment, the stick 21 is formed with a second chamber 212. The slide portion 51 of the adjustment base 5 is a slide bar. The slide bar is inserted into the second chamber 212 and is in slidable fit with the inner wall of the second chamber 212. When the gamer pulls and tilts the stick 21, since there is a certain contact area between the rotation portion 52 of the adjustment base 5 and the adjustment plate 3, the rotational pivot of the adjustment base 5 and the stick 21 is not located at the axis position shown in this figure, and thus the distance between the adjustment base 5 and the stick 21 is shortened, so that the first spring 6 abutting against the stick 21 and the rotation portion 52 of the adjustment base 5 is compressed, and the stick 21 therefore has a tendency to reset to the center. It can be understood that, in other embodiments, the stick 21 can be formed with a slide bar, and the slide portion 51 of the adjustment base can be formed with a chamber that accommodates this slide bar and slidably fits with the slide bar, so that the effect of slide portion 51 and the stick 21 being in telescopic nested sliding fit can also be achieved.

Figure 7:
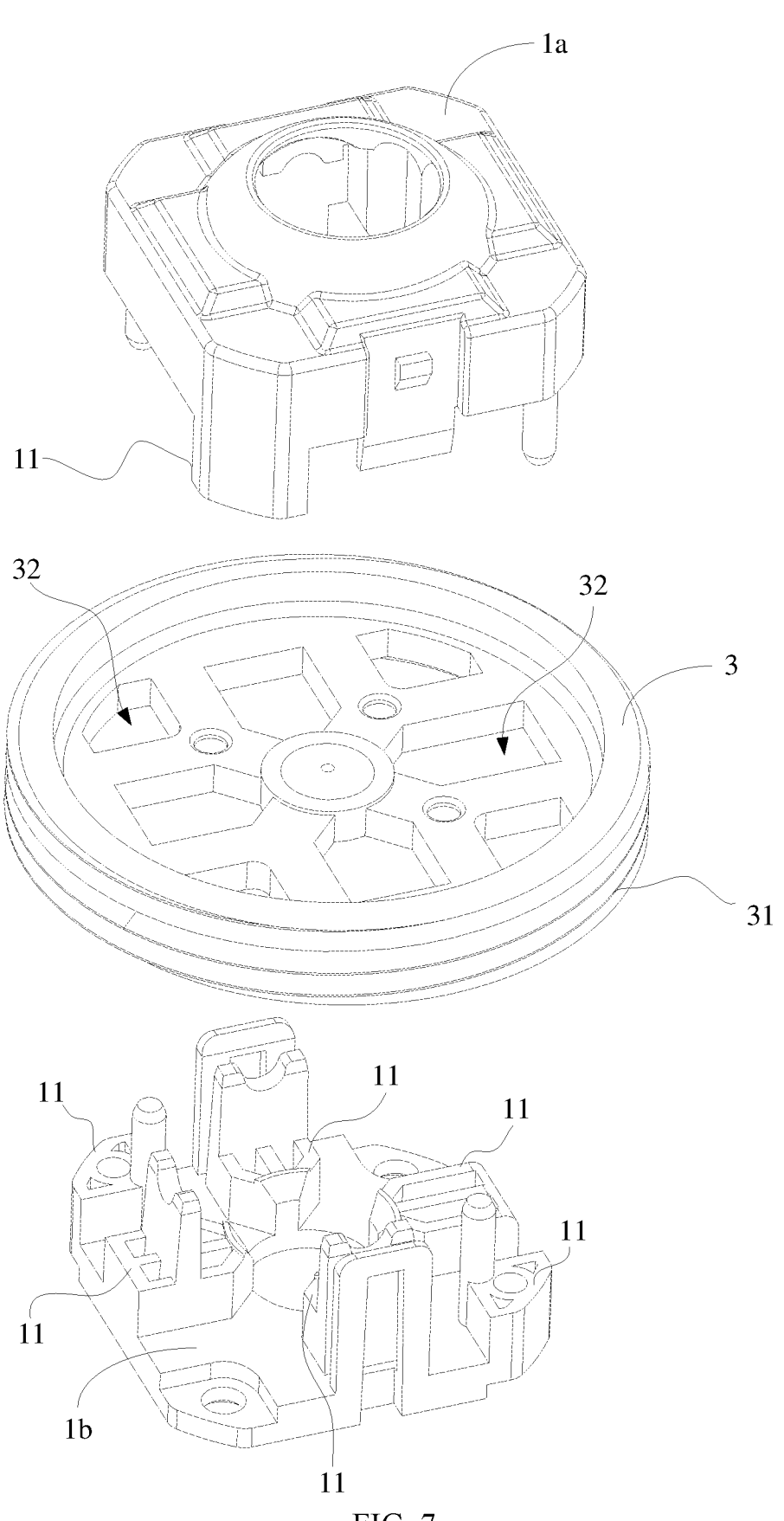
FIG. 7 is a schematic exploded view of the base part and the adjustment plate in FIG. 1.

Specifically, referring to FIGS. 5 to 7, in this embodiment, the adjustment plate 3 is formed with multiple limiting holes 32, and the upper shell 1a and the lower shell 1b of the base part are formed with multiple limiting columns 11 corresponding to the multiple limiting holes 32. The limiting columns 11 pass through the limiting holes 32 to restrict the rotation of the adjustment plate 3 relative to the base part, so that the adjustment plate 3 can only translate in the base part. The periphery of the adjustment plate 3 is formed with external threads 31, and the inner wall of the adjustment knob 4 is correspondingly formed with internal thread 41. The external threads 31 and the internal thread 41 cooperate to allow the adjustment knob 4 to drive the adjustment plate 3 translate relative to the base part, when the adjustment knob 4 rotates, to drive the adjustment base 5 move close to or away from the stick 21, which allows that when the stick 21 is at the center, the initial compression of the first spring 6 can be adjusted, and the damping of the thumbstick assembly 100 is adjustable. It can be understood that when the stick 21 is at the center, the closer the adjustment base 5 is to the stick 21, i.e., the greater the initial compression of the first spring 6 is, the greater the force required for the gamer to pull and tilt the stick 21 is, thus the size of the damping is greater; while the further the adjustment base 5 is to the stick 21, i.e., the lesser the initial compression of the first spring 6 is, and the lesser the force required for the gamer to pull and tilt the stick 21 is, thus the size of the damping is lesser. In this way, the gamer only needs to rotate the adjustment knob 4 located outside the thumbstick part 2 to adjust the damping of the thumbstick assembly according to his/her preference.

In other embodiments, the inner wall of the adjustment knob 4 can be formed with multiple protrusions, and the adjustment plate 3 can be formed with a groove spirally extending on its periphery. The multiple protrusions are inserted into the groove, and the adjustment knob 4 is rotatably connected to the adjustment plate 3 by the cooperation of the protrusions and the groove, and the effect of rotating the adjustment knob 4 to drive the adjustment base 5 move to adjust the damping can also be achieved. In other embodiments, the external threads can be formed on the outer wall of the adjustment knob 4, and the adjustment plate 3 can be formed with a sleeve-shaped structure sleeved on the outer wall of the adjustment knob 4, and the inner wall of the sleeve-shaped structure is formed with internal thread corresponding to the external threads. In this way, the adjustment knob 4 can also be rotatably connected to the adjustment plate 3 by the thread structure. Similarly, in other embodiments, the base part can be formed with limiting holes 32, and the adjustment plate 3 can be formed with limiting columns 11, so that the adjustment plate 3 can also be translationally connected to the base part.

Specifically, in this embodiment, the turns of the internal thread 41 of the adjustment knob 4 is greater than the turns of the external thread 31 of the adjustment plate 3, so that larger adjustment range can be achieved. The present application is not limited by this, the turns of the internal thread 41 and the turns of the external thread 31 can be adaptively adjusted according to actual adjustment demands (such as the screw pitch or adjustment range).

Referring to FIGS. 2, 5 and 6, in this embodiment, the thumbstick assembly 100 further includes a second spring 7. One end of the second spring 7 abuts against the lower end face of the adjustment plate 3, and the other end of second spring 7 abuts against the base part, so as to play a role of support and balancing the load for the adjustment plate 3, which allows the gamer to rotate the adjustment knob 4 more smoothly and allows thumbstick assembly 100 to have a better hand feeling. In order to maintain a better structural stability, in this embodiment, the second spring 7 is a conical spiral spring. But the present application is not limited by this, in other embodiment, the thumbstick assembly 100 may not include the second spring 7, and the basic damping adjustment effect can also be achieved.

Referring to FIGS. 1 and 2, in this embodiment, the thumbstick assembly 100 further includes a thumbstick cap 8. The thumbstick cap 8 is configured to provide finger support for the gamer, facilitating the gamer's operation. In other embodiments, the thumbstick assembly 100 may not include the thumbstick cap 8, and the gamer can install his/her preferred thumbstick cap according to personal demand.

Figure 4:
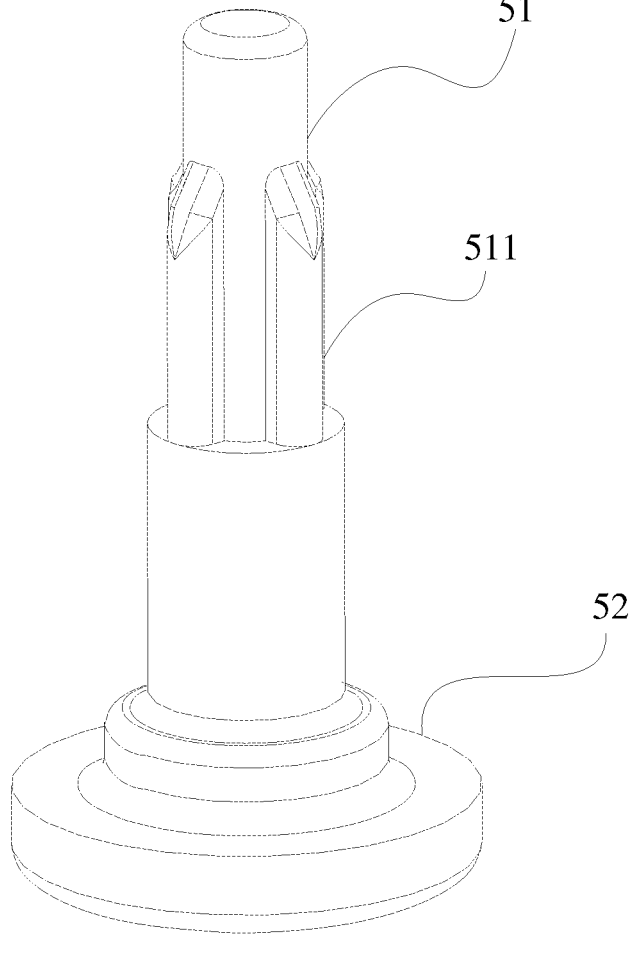
FIG. 4 is a schematic structural view of the adjustment base in FIG. 2.

Referring to FIG. 4, in this embodiment, the periphery of the slide bar is formed with multiple slide ridges 511, the multiple slide ridges 511 are in slidable fit with the inner wall of the second chamber 212, so as to reduce the contact area between the slide bar and the inner wall of the second chamber 212 and to improve the smoothness of operating the thumbstick. In other embodiments, the periphery of the slide bar may not be formed with the slide ridges 511.

Referring to FIG. 1, in this embodiment, the upper end of the adjustment knob 4 is formed with an adjustment ring 42, and multiple projections are formed on the adjustment ring 42 to facilitate the gamer to use his/her finger to rotate the adjustment knob 4. In this embodiment, there are indicational arrows 43 on the upper end of the adjustment knob 4 for indicating the rotation direction of the adjustment knob 4. Further, there can be indicational texts 44 for indicating which direction the adjustment knob 4 rotates to is to increase the damping and which direction is to decrease the damping.

It can be understood that the adjustment plate 3 in this embodiment is of a disk shape, but the present application is not limited by this. In other embodiments, the adjustment plate 3 can be configured as half-round, oval, or rectangular, two sides of the rectangular is set as arcs, and providing external thread on the periphery of the arcs is also possible. Similarly, the adjustment knob 4 of this embodiment is a column-shaped shell structure, but the present application is also not limited by this, the adjustment knob 4 can be in other shape as long as it can be rotated and drive the adjustment plate 3 translate.

Although the thumbstick part 2 in this embodiment includes the substrate 2, the flexible printed circuit board 24, the Hall integrated circuits 243, the first magnet 221, the second magnet 231, the pressing base 232 and the dome switch 242, the present application is not limited by this. In other embodiments, a thumbstick assembly with potentiometers can be used to replace the thumbstick part 2 in this embodiment. In some special cases, the thumbstick part 2 can only include the stick 21, the upper rocker arm 22 and the lower rocker arm 23. In this condition, the thumbstick assembly 100 will not output electrical signals but only for testing personnel to test and adjust the operation hand feeling of the thumbstick assembly 100, and this condition should also fall with the scope of the present application.

An embodiment of the present application further proposes a gamepad 200, which includes a gamepad housing 201 and the above-mentioned thumbstick assembly 100 with adjustable damping. The gamepad housing 201 is formed with an installation opening. The adjustment knob 4 of the thumbstick assembly 100 with adjustable damping is rotatably installed at the gamepad 200. The base part of the thumbstick assembly 100 with adjustable damping is fixedly installed at the gamepad 200. At least part of the structure (such as the adjustment ring 42) of the upper end of the adjustment knob 4 passes through the installation opening and protrudes from the outer surface of the gamepad housing 201. In this way, the gamer can easily turn the adjustment knob 4 to adjust the damping of the thumbstick assembly 100.

In theory, as long as the adjustment knob 4 of the thumbstick assembly 100 is rotatably installed at the gamepad 200 and the base part is fixedly installed at the gamepad 200, the rotation of the adjustment knob 4 can be converted into the translation of the adjustment plate 3. As a possible implementation, the gamepad housing 201 can be formed with a limit groove on the side wall of its installation opening, and the outer wall of the adjustment knob 4 is correspondingly formed with a limit clamping protrusion. The adjustment knob 4 is rotatably installed at the gamepad 200 by the cooperation of the limit groove and the limit clamping protrusion, and the base part is fixed to the gamepad 200 by fasteners (such as solder, screws).

Figure 8:
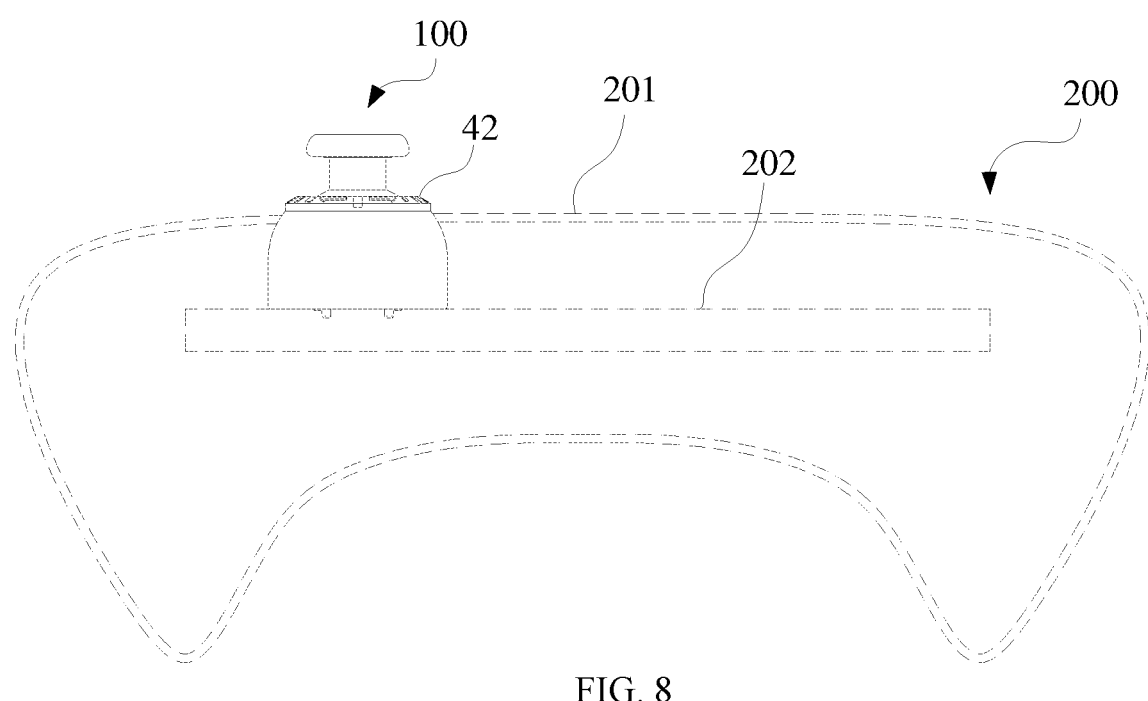
FIG. 8 is schematic view of a gamepad according to an embodiment of the present application.

Referring to FIG. 8, in an embodiment, the gamepad 200 further includes an installation base 202 provided inside the gamepad housing 201, the base part is fixedly installed on the installation base 202 by screws, the adjustment knob 4 is of a column-shaped shell structure, and the outer diameter of the upper end of the adjustment knob 4 gradually decreases in its extension direction; the lower end of the adjustment knob 4 abuts the installation base 202, the upper end of the adjustment knob 4 abuts the edge of the installation opening. In this way, the translational degrees of freedom in the up and down direction of the adjustment knob 4 are restricted by the installation base 202 and the edge of the installation opening, thus the rotation of the adjustment knob 4 can be converted into the translation of the adjustment plate 3, the structure of which is simple and is convenient for assembly.

The above-mentioned embodiments are only some embodiments of the present application, and are not intended to limit the scope of the present application. Any equivalent structural variation made by using the content of the description and the accompanying drawings of the present application, direct or indirect application on other related technical fields, should all fall within the scope of the present application.

What is claimed is:

1. A thumbstick assembly with adjustable damping, comprising:
   a base part;
   a thumbstick part rotatably installed at the base part and comprising a stick movable relative to the base part, wherein the stick is formed with a first chamber;
   an adjustment plate translationally connected to the base part;
   an adjustment knob, being of a shell structure, located at an outer side of the thumbstick part, rotatably connected to the adjustment plate and configured to drive the adjustment plate translate close or away from the stick when being rotated;
   an adjustment base comprising a slide portion and a rotation portion connected to the slide portion, wherein the slide portion and the stick are in telescopic nested sliding fit, and an upper end face of the adjustment plate is abutted against the rotation portion; and
   a first spring sleeved on the slide portion, wherein at least a part of the first spring is accommodated in the first chamber, one end of the first spring is abutted against the rotation portion, and the other end of the first spring is abutted against the stick.

2. The thumbstick assembly with adjustable damping according to claim 1, wherein the adjustment knob is rotatably connected to the adjustment plate by thread.

3. The thumbstick assembly with adjustable damping according to claim 2, wherein an inner wall of the adjustment knob is formed with internal thread, and a periphery of the adjustment plate is formed with external thread.

4. The thumbstick assembly with adjustable damping according to claim 1, further comprising a second spring; wherein one end of the second spring abuts against a lower end face of the adjustment plate, and the other end of the second spring abuts against the base part.

5. The thumbstick assembly with adjustable damping according to claim 1, wherein the adjustment plate is formed with multiple limiting holes, the base part is formed with multiple limiting columns corresponding to the multiple limiting holes, and the limiting columns pass through the limiting holes to restrict a rotation of the adjustment plate relative to the base part.

6. The thumbstick assembly with adjustable damping according to claim 1, wherein the stick is further formed with a second chamber, the slide portion is a slide bar, and the slide bar is inserted into the second chamber and is in slidable fit with an inner wall of the second chamber.

7. The thumbstick assembly with adjustable damping according to claim 6, wherein a periphery of the slide bar is formed with multiple slide ridges, and the multiple slide ridges are in slidable fit with the inner wall of the second chamber.

8. The thumbstick assembly with adjustable damping according to claim 1, wherein:
   an upper end of the adjustment knob is formed with an adjustment ring, and multiple projections are formed on the adjustment ring; and/or
   indicational arrows and/or indicational texts are provided on the upper end of the adjustment knob for indicating rotation directions of the adjustment knob.

9. A gamepad comprising:
   a gamepad housing formed with an installation opening; and
   the thumbstick assembly with adjustable damping according to claim 1;
   wherein the adjustment knob of the thumbstick assembly with adjustable damping is rotatably installed at the gamepad, the base part of the thumbstick assembly with adjustable damping is fixedly installed at the gamepad, and at least part of structure of the upper end of the adjustment knob passes through the installation opening and protrudes from an outer surface of the gamepad housing.

10. The gamepad according to claim 9, further comprising an installation base provided inside the gamepad housing;

wherein the base part is fixedly installed on the installation base, the adjustment knob is of a column-shaped shell structure, and an outer diameter of the upper end of the adjustment knob gradually decreases in an extension direction of the upper end of the adjustment knob; a lower end of the adjustment knob abuts the installation base, and the upper end of the adjustment knob abuts an edge of the installation opening.

\* \* \* \* \*